United States Patent [19]
Hendy

[11] Patent Number: 5,049,642
[45] Date of Patent: Sep. 17, 1991

[54] AROMATIC POLYMERS

[75] Inventor: Brian N. Hendy, Middlesbrough, United Kingdom

[73] Assignee: Imperial Chemical Industries PLC, London, England

[21] Appl. No.: 454,438

[22] Filed: Dec. 21, 1989

[30] Foreign Application Priority Data

Dec. 23, 1988 [GB] United Kingdom ............... 8830076

[51] Int. Cl.$^5$ .................. G01J 5/00; C08G 65/38; C08G 75/24
[52] U.S. Cl. .................. 528/171; 528/174; 528/175; 528/219; 374/125
[58] Field of Search ............... 528/171, 175, 174, 219; 374/125

[56] References Cited

U.S. PATENT DOCUMENTS

| 4,654,410 | 3/1987 | Kashiwame et al. | 528/171 |
| 4,866,099 | 9/1989 | Hendy | 524/465 |

FOREIGN PATENT DOCUMENTS

| 0000361 | 1/1979 | European Pat. Off. | 528/171 |
| 0049070 | 4/1982 | European Pat. Off. | 528/174 |
| 135130 | 8/1984 | European Pat. Off. | |
| 278720 | 2/1988 | European Pat. Off. | |
| 2139535 | 8/1971 | Fed. Rep. of Germany | 528/171 |
| 2355927 | 11/1972 | Fed. Rep. of Germany | 528/171 |
| 1070530 | 3/1989 | United Kingdom | 528/174 |
| 1207320 | 8/1989 | United Kingdom | 528/174 |

Primary Examiner—John Kight, III
Assistant Examiner—Kathryne E. Shelborne
Attorney, Agent, or Firm—Cushman, Darby & Cushman

[57] ABSTRACT

Sulphonated polyarylethers or thioethers are formed by polycondensing difunctional monomers having phenolic and/or thiophenolic and/or halogenic end groups in the presence of a dipolar aprotic solvent, at least to one of which monomers a sulphonic acid or a sulphonate salt is attached. The monomer(s) which the sulphonate group is attached is selected from monomers of formula I:

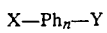

$$X-Ph_n-Y \qquad \qquad I$$

wherein:
Ph is phenylene;
X and Y are independently —OH or —SH; and
n is an integer selected from 1 to 3.

19 Claims, No Drawings

AROMATIC POLYMERS

This invention relates to aromatic polymers particularly polyarylethers and polyarylthioethers.

It has been proposed, for example in EP-A-8894, EP-A-8895 and EP-A-41780, to controllably sulphonate certain polyarylethersulphones and polyaryletherketones. The sulphonating agent, e.g. concentrated sulphuric acid, appears to selectively sulphonate the sub-unit:

—O—Ph—O—

(Ph being paraphenylene) of the polymer. The sulphonation of the polymers is to some extent controllable by selection of the sulphonating agent, reaction times etc and also more effectively by selecting the proportion of sub-units I present in the polymer, the repeat units:

—Ph—A—Ph—O—

(where A is CO or $SO_2$) not being sulphonated under the reaction conditions used. If stronger sulphonating conditions are used to sulphonate other parts of the polymer, degradation of the polymer occurs.

Those proposals have the limitations that sulphonation involves a post-polymerisation process.

EP-B-185237 relates to polyamide/polyarylethersulphone blends in which at least one of the polyarylethersulphones has acidic groups including inter alia sulphonic acid groups. The specification discloses either post-polymerisation acidification as described above or, alternatively, making polymers from sulphonated monomers. However, the specification only refers to conventional polymerisation techniques and does not exemplify the manufacture of such a polymer. The Applicants failed to make such polymers from sulphonated monomers using conventional polymerisation techniques.

Polish Patent No. 102339 discloses the manufacture of sulphonated polymers from what appears to be 3,3'-disupho-4,4'-dichlorodiphenyl-sulphone (sodium or potassium salt) and sodium or potassium bisphenolates. However, the only reaction exemplified is with bisphenol A and only an RV of 0.2 is attained suggesting (owing to sulphonated polymers having an RV significantly higher than the equivalent unsulphonated polymer) a very low molecular weight, i.e. significantly lower than that suggested in the patent.

The Applicants have now found that, surprisingly, polymers can be made from selected sulphonated monomers thus eliminating a post-polymerisation sulphonation step.

According to the present invention, an aromatic polymer comprising divalent aromatic units connected by ether and/or thioether linkages is formed by polycondensation of difunctional monomers having phenolic and/or thiophenolic and/or halogenic end groups in the presence of a dipolar aprotic solvent, at least to one of which monomers a sulphonic acid or a sulphonate salt is attached, said at least one monomer being selected from monomers of formula I:

X—Ph$_n$—Y      I wherein:
Ph is phenylene;
X and Y are independently —OH or —SH; and
n is an integer selected from 1 to 3.

Preferably, the polymerisation has to take place in the presence of sufficient alkali to maintain the mixture neutral, i.e. to neutralise the sulphonic acid or, if initially present as such, the sulphonyl halide.

Preferably, the sulphonate salt is attached directly to a nuclear carbon atom.

Preferably, said sulphonate salt comprises an alkali metal salt, preferably the potassium salt.

Monomers of formula I are preferably selected from hydroquinone, 4,4'-dihydroxybiphenyl and 4,4''-dihydroxyterphenyl.

Preferably, the monomers are selected from bisphenols or bisthiophenols and dihalides. Typical examples of suitable monomers for use in making an aromatic polymer according to the invention are:

bisphenols/bisthiophenols:
   hydroquinone
   resorcinol
   1,3-dithiobenzene
   1,4-dithiobenzene
   4,4'-dihydroxybenzophenone
   4,4'-dithiobenzophenone
   2,2-bis(4-hydroxyphenyl)propane
   bis(4-hydroxyphenyl)sulphone
   bis(4-hydroxyphenyl)sulphide
   4,4'-dihydroxybiphenyl
   4,4''-dihydroxyterphenyl bishalides:
   bis(4-fluorophenyl)sulphone
   bis(4-chlorophenyl)sulphone
   4,4'-difluorobenzophenone
   4,4'-dichlorobenzophenone
   4,6-difluoroisophthaloyl nitrile.

The ratio of sulphonated to non-sulphonated units in the resultant polymer is selected according to the application for which the polymer is intended. When the ratio of sulphonated to non-sulphonated units is $>=1:3$, the polymers are generally soluble in water which dominates, if not limits, their uses. Thus, in practice, useful polymers are obtainable in which that ratio is $<1:3$ since such polymers are generally insoluble, although swollen, in water. Such polymers find particular use as membranes in aqueous reverse osmosis. However, polymers in which the ratio is $>=1:3$ are not precluded for other applications. The sulphonated monomer can be used in combination with the equivalent unsulphonated monomer and/or with other different monomers of the same phenolic/halogenic end group type.

The invention preferably comprises polycondensing monomers of formula I, in which X and Y are preferably —OH, with monomers of formula II:

$X^1$—Ar—B—Ar$^1$—$Y^1$      II wherein:
$X^1$ and $Y^1$ are independently —OH, —SH or halogen, preferably Cl or F;
B is O, S, $SO_2$ and/or CO and/or $C_1$ to $C_6$ alkyl, which may be a cycloaliphatic ring, and/or phenylene and/or a direct link; and
Ar and Ar$^1$ are divalent aromatic radicals which may be the same as or different from one another;
B and/or Ar and/or Ar$^1$ being selected, when $X^1$ and/or $Y^1$ is halogen, to activate said halogen to nucleophilic substitution, said halogen and said hydroxyl and- /or thiol groups being present in substantially equimolar amounts.

The invention particularly comprises polycondensing monomers of formula I, in which X and Y are preferably —OH, with monomers of formula II:

$$X^1—Ph—B—Ph—Y^1 \qquad II$$

wherein:
$X^1$ and $Y^1$ are independently —OH, —SH or halogen, preferably Cl or F;
Ph is 1,4-phenylene or 1,3-phenylene; and
B is O, S, $SO_2$ and/or CO and/or $C_1$ to $C_6$ alkyl, which may be a cycloaliphatic ring, and/or phenylene and/or a direct link;
B being selected, when $X^1$ and/or $Y^1$ is halogen, to activate said halogen to nucleophilic substitution, said halogen and said hydroxyl and/or thiol groups being present in substantially equimolar amounts.

Preferably, the mole fraction of monomers of formula I is between 0 and 2.5%, more particularly between 0 and 1.0% and especially between 0 and 0.7%, in excess of the stoichiometric requirement.

One particularly useful class of polymers, according to the invention, is made by the condensation polymerisation of potassium hydroquinone mono or di sulphonate with bis(4-fluorophenyl)sulphone either alone or with other bisphenols. Polymerisation can be suitably achieved by reacting the monomers together in a solvent containing a base at temperatures of the order of 150° C. to 260°, preferably 205° C. to 210° C. The solvent is required to keep both covalent and ionic species in solution. Examples of suitable solvents are dipolar aprotic solvents such as N-methylpyrrolidone, dimethylsulphoxide, dimethylformamide, sulpholane and dimethylimidazolidone. This is in contrast to more conventional polymerisation processes in which the solvent is required to solubilise covalent species only.

The invention is further described by reference to the following Examples in some of which polymers were prepared using the following basic procedure:

a) the monomers, in equimolar amounts (or purposefully "imbalanced" amounts), were added to a 3-necked flask and stirred together with an approximately equimolar amount of the base potassium carbonate or a slight excess thereof and a solvent. Where other than equimolar amounts were used, that is indicated in the specific examples by a (% xs) figure. In some of the examples, toluene was included in the solvent to sweep out the water formed during the condensation polymerisation of the monomers;

b) the reaction mixture was initially heated to dissolve the monomers and the base and then the temperature of the mixture was raised over a period of time up to about the boiling point of the solvent, i.e. 202° C. to 210° C., solvent also being removed from the flask at this stage of the process. After the reaction, the resultant very viscous solution was diluted with dimethylformamide to reduce its viscosity;

c) the polymer was isolated by pouring the cooled viscous solution into methanol or water, macerating the polymer, which precipitated in a lumpy or stringy form, and then repeatedly washing the polymer successively with methanol and water. The polymer was then dried in an oven under reduced pressure; and d) the final polymer product was typically a white or off-white powder.

EXAMPLE 1

Starting materials:

| | |
|---|---|
| Potassium 2,5-dihydroxybenzene sulphonate (mono-potassium sulphonate of hydroquinone) (recrystallised) | 19.74 g (0.71% xs) (0.0865 mole) |
| 4,4'-difluorodiphenylsulphone | 21.83 g (0.0859 mole) |
| Potassium carbonate | 12.10 g (2% xs) (0.0876 mole) |
| N-methyl pyrrolidone (NMP) | 50 ml |
| Toluene | 15 ml |
| Dimethylformamide (DMF) | 100 ml |

Reaction conditions:

| Temperature(°C.) | Time (hours) | Comment |
|---|---|---|
| 80 | | Initial mixing |
| 120 | 1 | |
| 210 | 2 | |
| 210 | 3½ | Total of 35 ml liquid removed |

The polymer has a reduced viscosity (RV) of 1.61. $K^+$ analysis (by "ashing" a sample of the polymer by ignition and determining the $K^+$ content of a solution of the ash by atomic absorption spectrometry) showed the polymer contained 87% of the theoretical maximum of $K^+$ salt.

EXAMPLE 2

Starting materials:

| | |
|---|---|
| Potassium 2,5-dihydroxybenzene sulphonate | 39.25 g (0.1% xs) (0.1719 mole) |
| 4,4'-dihydroxydiphenylsulphone | 64.45 g (0.2575 mole) |
| 4,4'-difluorodiphenylsulphone | 109.15 g (0.4293 mole) |
| Potassium carbonate | 60.50 g (2% xs) (0.4378 mole) |
| NMP | 250 ml |
| Toluene | 50 ml |
| DMF | 150 ml |

The molar ratio of dihydroxysulphonate to the dihydroxysulphone is 40:60.

Reaction conditions:

| Temperature(°C.) | Time (hours) | Comment |
|---|---|---|
| 80 | | Initial mixing |
| 100 | 1¼ | |
| 140 | ½ | |
| 160 | ½ | |
| 150 | ¼ | |
| 160 | ½ | |
| 190 | ¾ | |
| 208 | 3 | All toluene removed together with 13 ml water. |
| 208 | 4 | Solvent remaining - 180 ml |

The polymer had an RV of 1.03. $K^+$ analysis showed the polymer contained 92.4% of the theoretical maximum of $K^+$ salt.

EXAMPLE 3

The starting materials and quantities used were the same as for Example 2.

Reaction conditions:

| Temperature (°C.) | Time (hours) | Comment |
|---|---|---|
| 60 | | 200 ml NMP added to solids and the temperature was raised to 130° C. over 45 minutes. |
| 130 | | 50 ml NMP/50 ml toluene added. |
| 130 | ¾ | |
| 140 | 1 | |
| 160 | 1 | |
| 180 | 2 | Total of 43 ml toluene/19 ml water removed. |
| 208 | 14 | At least 100 ml NMP removed. |
| — | — | Cooled overnight under nitrogen |
| 208 | 4 | |
| 240 | ¼ | |

Following the removal of the polymer, a residue remained in the flask. DMF (200 ml) was added to the flask and the solution refluxed (at about 150° C.) for 2 hours. More polymer was obtained from this solution. The remaining residue was soaked in methanol for 2 hours and removed from the flask. Some of the residue was in the form of very hard lumps which were treated and evaluated separately.

The bulk of the polymer had an RV of 1.7 and K+ analysis showed the polymer contained 97.6% of the theoretical maximum of K+ salt.

The hard lumps had an RV of 1.878.

EXAMPLE 4

The copolymer (110 g) made in accordance with Example 3 was stirred in boiling demineralised water (1.41) together with concentrated hydrochloric acid (400 ml) for 1 hour. The polymer was filtered off, washed with 20/80 solution of concentrated hydrochloric acid/water and then re-slurried in water (1 l) and concentrated hydrochloric acid (400 ml). The process was repeated. More acid (100 ml) was added and the mixture was boiled for a further 1 hour. The polymer was filtered off, washed twice with a dilute hydrochloric acid solution and then repeatedly with boiling demineralised water before being dried under reduced pressure in an oven.

The resultant sulphonic acid form of the polymer had an RV of 1.574. K+ analysis of the polymer showed a residual K+ content of 0.077% which corresponds to ca 2.2% of the available sulphonate groups being in the potassium form.

Nuclear magnetic resonance spectroscopy of polymer made in accordance with Example 1 and with Examples 2 and 3 showed polymers had been made with the following formulae, respectively:

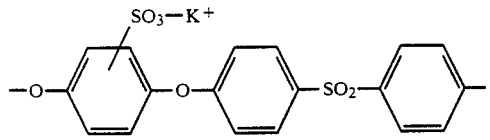

V and V in combination with VI below

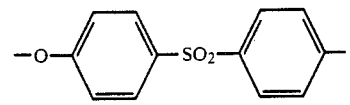

VI

EXAMPLE 5

The polymer of Example 4 was formed into a membrane and was subjected to an osmosis test using 5% NaCl/18 Mohm water. The water permeability and salt permeability of the membrane was substantially the same as the corresponding permeabilities of a membrane made from an equivalent post-polymerisation sulphonated polymer. The membrane also had a substantially superior performance to a conventional cellulose acetate membrane (see Journal of Applied Polymer Science, vol 9 (1965), page 1341, Lonsdale et al).

EXAMPLE 6

Starting materials:

| | |
|---|---|
| Potassium 2,5-dihydroxybenzene sulphonate (mono-potassium sulphonate of hydroquinone) (recrystallised) | 7.85 g (0.0% xs) (0.0344 mole) |
| 4,4'-dihydroxydiphenylsulphone | 12.89 g (0.0515 mole) |
| 4,4'-difluorodiphenylsulphone | 21.83 g (0.0859 mole) |
| Potassium carbonate | 12.10 g (2% xs) (0.0876 mole) |
| N-methyl pyrrolidone (NMP) | 60 ml |
| Dimethylformamide (DMF) | 60 ml |

The molar ratio of dihydroxysulphonate to the dihydroxysulphone is 40:60.

The reaction mixture was heated up over approximately 2 hours to the final reaction temperature of 205° C. at which it was held for 5 hours.

The polymer has a reduced viscosity (RV) of 1.91. K+ analysis (by "ashing" a sample of the polymer by ignition and determining the K+ content of a solution of the ash by atomic absorption spectrometry) showed the polymer containined 93.2% of the theoretical maximum of K+ salt.

EXAMPLE 7

Starting materials:

| | |
|---|---|
| Potassium 2,5-dihydroxybenzene sulphonate (mono-potassium sulphonate of hydroquinone) (recrystallised) | 19.77 g (0.9% xs) (0.0866 mole) |
| 4,4'-difluorodiphenylsulphone | 21.83 g (0.0859 mole) |
| Potassium carbonate | 12.10 g (2% xs) (0.0876 mole) |
| N-methyl pyrrolidone (NMP) | 60 ml |
| Dimethylformamide (DMF) | 60 ml |

The reaction mixture was heated up over approximately 2 hours to the final reaction temperature of 205° C. at which it was held for 6 hours.

The polymer has a reduced viscosity (RV) of 0.72. K+ analysis (by "ashing" a sample of the polymer by ignition and determining the K+ content of a solution of the ash by atomic absorption spectrometry) showed the polymer contained 95.6% of the theoretical maximum of K+ salt.

EXAMPLE 8

Starting materials:

| | |
|---|---|
| Potassium 2,5-dihydroxy-benzene sulphonate (mono-potassium sulphonate of hydroquinone) (recrystallised) | 16.01 g (1.4% xs) (0.0701 mole) |
| 4,4'-dihydroxydiphenyl-sulphone | 4.18 g (0.0167 mole) |
| 4,4'-difluorodiphenylsulphone | 21.83 g (0.0859 mole) |
| Potassium carbonate | 12.10 g (2.% xs) (0.0876 mole) |
| N-methyl pyrrolidone (NMP) | 60 ml |
| Dimethylformamide (DMF) | 60 ml |

The molar ratio of dihydroxysulphonate to the dihydroxysulphone is 80:20.

The reaction mixture was heated up over approximately 2 hours to the final reaction temperature of 205° C. at which it was held for 9 hours.

The polymer has a reduced viscosity (RV) of 1.13. K+ analysis (by "ashing" a sample of the polymer by ignition and determining the K+ content of a solution of the ash by atomic absorption spectrometry) showed the polymer containined 96.8% of the theoretical maximum of K+ salt.

EXAMPLE 9

Starting materials:

| | |
|---|---|
| Potassium 2,5-dihydroxy-benzene sulphonate (mono-potassium sulphonate of hydroquinone) (recrystallised) | 15.84 g (1.0% xs) (0.0644 mole) |
| 4,4'-dihydroxydiphenyl-sulphone | 4.30 g (0.0177 mole) |
| 4,4'-difluorodiphenylsulphone | 21.83 g (0.0859 mole) |
| Potassium carbonate | 12.10 g (2% xs) (0.0876 mole) |
| Sulpholane | 80 ml |

The molar ratio of dihydroxysulphonate to the dihydroxysulphone is 80:20.

The reaction mixture was heated up over approximately 2 hours to the final reaction temperature of 220° C. at which it was held for 3 hours.

The polymer has a reduced viscosity (RV) of 0.82. K+ analysis (by "ashing" a sample of the polymer by ignition and determining the K+ content of a solution of the ash by atomic absorption spectrometry) showed the polymer contained 85.7% of the theoretical maximum of K+ salt.

EXAMPLE 10 (COMPARATIVE)

Starting materials:

| | |
|---|---|
| Potassium 2,5-dihydroxy-benzene sulphonate (mono-potsssium sulphonate of hydroquinone) (recrystallised) | 16.01 g (1.4% xs) (0.0701 mole) |
| 4,4'-dihydroxydiphenyl-sulphone | 4.18 g (0.0167 mole) |
| 4,4'-difluorodiphenylsulphone | 21.83 g (0.0859 mole) |
| Potassium carbonate | 12.10 g (2% xs) (0.0876 mole) |
| Diphenylsulphone | 60 g |

The molar ratio of dihydroxysulphonate to the dihydroxysulphone is 80:20.

The reaction mixture was heated up over approximately 2 hours to the final reaction temperature of 260° C. at which it was held for 1 hour.

These conditions represent a typical condensation polymerisation for producing polyarylethersulphones. No polymer was formed under these conditions.

EXAMPLE 11 (COMPARATIVE)

Starting materials:

| | |
|---|---|
| Potassium 2,5-dihydroxy-benzene sulphonate (mono-potassium sulphonate of hydroquinone) (recrystallised) | 16.01 g (1.4% xs) (0.0701 mole) |
| 4,4'-dihydroxydiphenyl-sulphone | 4.18 g (0.0167 mole) |
| 4,4'-difluorodiphenylsulphone | 21.83 g (0.0859 mole) |
| Potassium carbonate | 12.10 g (2% xs) (0.0876 mole) |
| Diphenylsulphone | 40 g |
| Toluene | 20 ml |

The molar ratio of dihydroxysulphonate to the dihydroxysulphone is 80:20.

The reaction mixture was heated up over approximately 2 hours to the final reaction temperature of 240° C. at which it was held for 4 hours.

These conditions represent a typical condensation polymerisation for producing polyarylethersulphones. No polymer was formed under these conditions.

EXAMPLE 12

Starting materials:

| | |
|---|---|
| Potassium 2,5-dihydroxy-benzene sulphonate (mono-potassium sulphonate of hydroquinone) (recrystallised) | 15.72 g (0.3% xs) (0.0689 mole) |
| 4,4'-dihydrorydiphenyl-sulphone | 4.30 g (0.0172 mole) |
| 4,4'-difluorodiphenylsulphone | 21.83 g (0.0859 mole) |
| Potassium carbonate | 12.10 g (2% xs) (0.0876 mole) |
| N-methylpyrrolidone (NMP) | 50 ml |
| Diphenylsulphone | 20 g |
| Toluene | 20 ml |

The molar ratio of dihydroxysulphonate to the dihydroxysulphone is 80:20.

The reaction mixture was heated up over approximately 2 hours to the final reaction temperature of 260° C. at which it was held for 2 hours.

Polymeric material having an RV of 0.48 was formed demonstrating the necessity of having a dipolar aprotic solvent present.

I claim:

1. A method of forming an aromatic polymer comprising divalent aromatic units connected by ether (—O—) and/or thioether (—S—) linkages at least one of said divalent aromatic units carrying a sulphonate group (—SO$_3$—), which method comprises polycondensing difunctional monomers having phenolic (—OH) and/or thiophenolic (—SH) and/or halogenic end groups in the presence of a dipolar aprotic solvent, at least to one of which monomers a sulphonic acid (—SO$_3$H) or salt thereof is attached, said at least one monomer comprising monomers of the formula $$X—Ph_n—Y \qquad (I)$$

wherein:
Ph is phenylene;
X and Y are independently —OH or —SH; and
n is an integer selected from 1 to 3.

2. A method for forming an aromatic polymer according to claim 1, in which the polycondensation occurs in the presence of sufficient alkali to maintain the reaction mixture neutral.

3. A method of forming an aromatic polymer according to claim 1, in which, in the monomer of formula I, the acid or salt thereof is attached directly to a nuclear carbon atom.

4. A method of forming an aromatic polymer according claim 1, in which, in the monomer of formula I, the salt, when present, comprises an alkali metal salt.

5. A method of forming an aromatic polymer according to claim 1, in which the monomers are selected from the group consisting of bisphenols, bisthiophenols and dihalides.

6. A method of forming an aromatic polymer according to claim 1, in which said monomers of formula I are reacted with monomers of formula II:

$$X^1—Ar—B—Ar^1—Y^1 \qquad (II)$$

wherein:
$X^1$ and $Y^1$ are independently —OH, —SH or halogen;
B is O, S, SO$_2$ and/or CO and/or C$_1$ to C$_6$ alkyl; and
Ar and Ar$^1$ are divalent aromatic radicals which may be the same as or different from one another;
B and/or Ar and/or Ar$^1$ being selected, when $X^1$ and/or $Y^1$ is halogen, to activate said halogen to nucleophilic substitution, said halogen and said hydroxyl and/or thiol groups being present in substantially equimolar amounts.

7. A method of forming an aromatic polymer according to claim 1, in which monomers of formula I are reacted with monomers of formula II:

$$[X]X^1—Ph—B—Ph—Y^1[Y] \qquad (II)$$

wherein:
$X^1$ and $Y^1$ are independently —OH, —SH or halogen;
Ph is 1,4-phenylene or 1,3-phenylene; and
B is O, S, SO$_2$ and/or CO and/or C$_1$ to C$_6$ alkyl;
B being selected, when $X^1$ and/or $Y^1$ is halogen, to activate said halogen to nucleophilic substitution, said halogen and said hydroxyl and/or thiol groups being present in substantially equimolar amounts.

8. A method of forming an aromatic polymer according to claim 1, in which said monomers of formula I are selected from the group consisting of hydroquinone, 4,4'-dihydroxybiphenyl and 4,4'''-dihydroxyterphenyl.

9. A method of forming an aromatic polymer according to claim 1, in which the mole fraction of said monomers of formula I is between 0 and 2.5%, in excess of the stoichiometric requirement.

10. A method of forming an aromatic polymer according to claim 1, in which the solvent is N-methylpyrrolidone, dimethylsulphoxide, dimethylformamide, sulpholane and dimethylimidazolidone.

11. A method of forming an aromatic polymer according to claim 4, in which, in the monomer of formula I, the alkali metal salt, is the potassium salt.

12. A method of forming an aromatic polymer according to claim 6, wherein X and Y in the monomers of formula I are both —OH.

13. A method of forming an aromatic polymer according to claim 6, wherein $X^1$ and $Y^1$ in formula II are selected from the group consisting of Cl and F.

14. A method of forming an aromatic polymer according to claim 6, wherein B of formula II is selected from the group consisting of cycloaliphatic ring, phenylene and direct link.

15. A method of forming an aromatic polymer according to claim 7, in which X and Y of formula I are —OH.

16. A method of forming an aromatic polymer according to claim 7, wherein $X^1$ and $Y^1$ of formula II are selected from the group consisting of Cl and F.

17. A method of forming an aromatic polymer according to claim 7, wherein B in formula II is selected from the group consisting of cycloaliphatic rings, phenylene, and direct link.

18. A method of forming an aromatic polymer according to claim 9, in which the mole fraction of said monomers of formula I is between 0 and 1.0%, in excess of the stoichiometric requirement.

19. A method of forming an aromatic polymer according to claim 18, in which the mole fraction of said monomers of formula I is between 0 and 0.7%, in excess of the stoichiometric requirement.

* * * * *